(12) United States Patent
Nakamiya et al.

(10) Patent No.: US 8,730,620 B1
(45) Date of Patent: May 20, 2014

(54) FLEXIBLE RAMP IN A HARD DISK DRIVE

(71) Applicant: HGST Netherlands B.V., Amsterdam (NL)

(72) Inventors: Teruhiro Nakamiya, Kawasaki (JP); Keiko Watanabe, Tsuchiura (JP); Kazuhide Ichikawa, Fujisawa (JP); Takeji Sumiya, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/669,231

(22) Filed: Nov. 5, 2012

(51) Int. Cl.
*G11B 5/54* (2006.01)

(52) U.S. Cl.
USPC ........................................ 360/254.7

(58) Field of Classification Search
USPC .......... 360/254.7, 254.4, 254.5, 254.6, 254.8, 360/254.9
See application file for complete search history.

(56) References Cited

U.S. PATENT DOCUMENTS

| | | | |
|---|---|---|---|
| 6,275,356 B1 | 8/2001 | Boutaghou et al. | |
| 6,452,753 B1 | 9/2002 | Hiller et al. | |
| 6,765,762 B2 | 7/2004 | Yanagihara | |
| 7,136,246 B2 | 11/2006 | Khanna et al. | |
| 7,672,083 B1 | 3/2010 | Yu et al. | |
| 7,768,745 B2 | 8/2010 | Okada et al. | |
| 8,120,872 B2 * | 2/2012 | Sekii et al. | 360/99.08 |
| 8,363,353 B2 * | 1/2013 | Yawata | 360/99.08 |
| 8,416,524 B2 * | 4/2013 | Saichi et al. | 360/99.08 |
| 2008/0074796 A1 | 3/2008 | Shimizu | |
| 2011/0122530 A1 * | 5/2011 | Sekii et al. | 360/99.08 |
| 2012/0200957 A1 * | 8/2012 | Yawata | 360/99.08 |
| 2013/0038964 A1 * | 2/2013 | Garbarino et al. | 360/99.08 |
| 2013/0050872 A1 * | 2/2013 | Sekii et al. | 360/99.08 |

OTHER PUBLICATIONS

Xu, Junguo et al., "Study on soft-particle intrusion in a head/ disk interface of load/ unload drives", *Magnetics, IEEE Transactions on*, vol. 36, No. 5, pp. 2745-2747, Sep. 2000 doi: 10.1109/20.908578. URL:http://ieeexplore.ieee.org/stamp/stamp.jsp?tp=&arnumber=908578&isnumber19613.

* cited by examiner

*Primary Examiner* — Allen T Cao

(57) ABSTRACT

An example hard disk drive (HDD) comprising a magnetic disk and a ramp within the HDD is disclosed. A slit is disposed between a ramp body and a flange.

20 Claims, 5 Drawing Sheets

FLEXIBLE RAMP IN A HARD DISK DRIVE

BACKGROUND

Hard disk drives (HDD) are widely used in many devices today. HDDs often require a high level of impact resistance such that they do not break when dropped. If a hard disk drive is dropped and the disks within the drive physically break or become deformed, the hard disk drive may be rendered useless.

BRIEF DESCRIPTION OF THE DRAWINGS

The accompanying drawings, which are incorporated in and form a part of this specification, illustrate and serve to explain the principles of embodiments in conjunction with the description. Unless specifically noted, the drawings referred to in this description should be understood as not being drawn to scale.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the present technology is intended to cover alternatives, modifications and equivalents, which may be included within the spirit and scope of the various embodiments as defined by the claims. Furthermore, in the following description, numerous specific details are set forth in order to provide a thorough understanding of the subject matter. In other instances, well-known methods, procedures, and objects have not been described in detail as not to unnecessarily obscure aspects of the subject matter.

Figure 1:
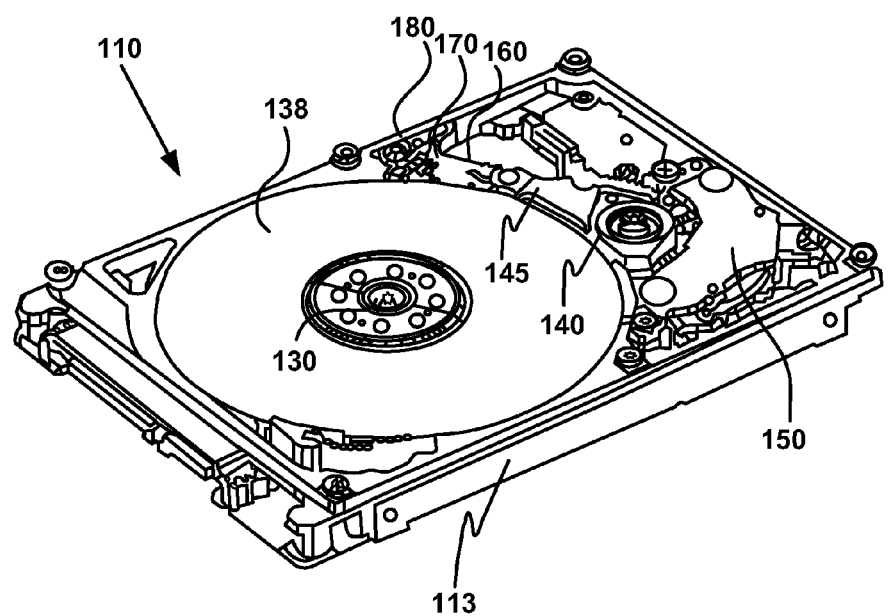
FIG. 1 shows an example hard disk drive, in accordance with one embodiment.

With reference now to FIG. 1, a schematic drawing of one embodiment of an information storage system including a magnetic hard disk drive (HDD) 110 for a computer system is shown, although only one head and one disk surface combination are shown. What is described herein for one head-disk combination is also applicable to multiple head-disk combinations. In other words, the present technology is independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable. In one embodiment, the magnetic disk 138 is comprised of aluminum. In one embodiment, the magnetic disk is comprised of glass.

A spindle motor assembly having a central drive hub 130 operates as the axis and rotates the disk 138 or disks of the disk pack in the radial direction relative to housing 113. An actuator assembly 140 includes one or more actuator arms 145. When a number of actuator arms 145 are present, they are usually represented in the form of a comb that is movably or pivotally mounted to base/housing 113. A controller 150 is also mounted to the base of housing 113 for selectively moving the actuator arms 145 relative to the disk 138. Actuator assembly 140 may be coupled with a connector assembly, such as a flex cable to convey data between arm electronics and a host system, such as a computer, wherein HDD 110 resides.

In one embodiment, each actuator arm 145 has extending from it at least one cantilevered integrated lead suspension (ILS) 160. The ILS 160 may be any form of lead suspension that can be used in a data access storage device. The level of integration containing the slider 170, ILS 160, and read/write head 310 is called the Head Gimbal Assembly (HGA).

In an embodiment, the ILS 160 has a spring-like quality, which biases or presses the air-bearing surface of slider 170 against disk 138 to cause slider 170 to fly at a precise distance from disk 138. ILS 160 has a hinge area that provides for the spring-like quality, and a flexing cable-type interconnect that supports read and write traces and electrical connections through the hinge area. Movement of the actuator assembly 140 by controller 150 causes the head gimbal assembly to move along radial arcs across tracks on the surface of disk 138.

Ramp assembly 180 supports ILS 160. Actuator arms 145 retract from over the magnetic disk 138 such that ILS 160 rests on ramp assembly 180. Ramp assembly 180 allows ILS 160 to move onto, and retract from over magnetic disk 138. During a power-on sequence, the ILS 160 and head 310 are loaded by moving the sliders 170 off the ramp assembly 180 and over the disk 138 surface when the disk 138 reaches an appropriate rotational speed. In an embodiment, an air current from the rotating disks 138 acts like a cushion between the sliders 170 and the disks 138, keeping the two surfaces separated by a designated distance called the flying height. Static friction, also known as stiction, is lessened by parking the head 310 off the disk 138 surface. Moreover, smoother disk 138 surfaces are facilitated by parking head 310 off the disk 138 surface. Smoother disk surfaces allow for closer head 310 fly heights, and contribute to improved signal to noise ratio during read and write operations. In addition, giant magnetoresistive heads 310 may be employed to increase track and bit densities on recording media.

The ramp assembly 180 comprises the slider 170, ramp 230 and a flange 210. For instance, if a magnetic disk 138 is deformed or the HDD is dropped, magnetic disk 138 may push on the ramp 230 and create abrasion debris. In some cases, abrasion debris can accumulate in a HDD 110 such as on a magnetic head 310 thereby making magnetic disk 138 more difficult to read.

Previous solutions to address the problem of the accumulation of abrasion debris include widening the gap between magnetic disk 138 and ramp 230 to prevent contact between magnetic disk 138 and ramp 230. A drawback to this technique is that it increases the space required by the ramp assembly 180 within the HDD 110. In another solution to the problem of abrasion debris, the stiffness of the magnetic disk 138 is increased such that magnetic disk 138 will not deform. A drawback to this technique is that as the thickness of disk 138 is increased, and again more space is required.

Figure 2A:
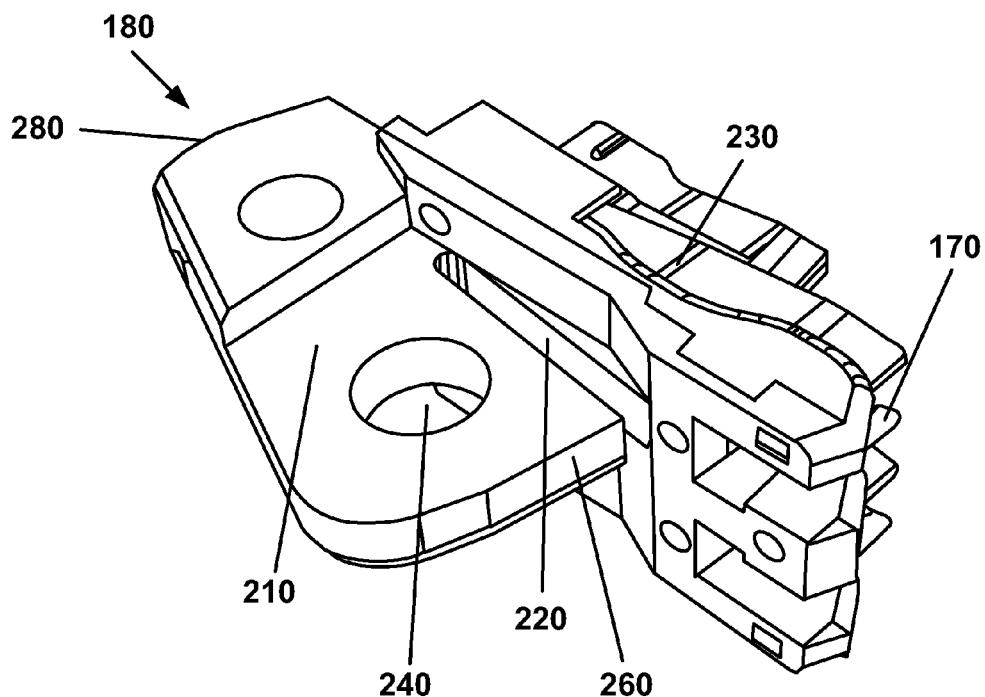
FIG. 2A is an example diagram of a ramp assembly, in accordance with one embodiment.
Figure 2B:
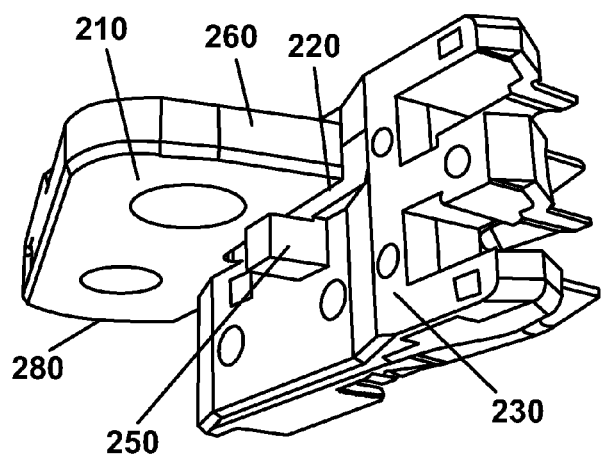
FIG. 2B is an example diagram of a ramp assembly, in accordance with one embodiment.

FIGS. 2A and 2B show embodiments of ramp assembly 180 from a top perspective and a bottom perspective, respectively. The embodiments shown in FIGS. 2A and 2B address the problem of abrasion debris without increasing the size of ramp assembly 180 or utilizing thicker disks 138. As briefly discussed above, ramp assembly 180 comprises slider 170, ramp 230, flange 210, slit 220, and a hole 240 for mounting flange 210 on the base of the housing 113. In one embodiment ramp assembly 180 also includes at least one stopper 250. In one embodiment ramp assembly 180 is comprised of a resin material that has a high level of mechanical strength, which inhibits the creation of abrasion debris.

In order to lessen the abrasion debris due to contact between magnetic disk 138 and ramp 230, in various embodiments described herein, the force with which magnetic disk 138 and ramp 230 come into contact can be reduced over previous solutions. A reduction in ramp stiffness is an effective way to reduce the contact force over previous solutions. In one embodiment, to decrease ramp stiffness, a slit 220 is disposed between ramp 230 and flange 210. In other words, slit 220 is a cutout of the material between ramp 230 and flange 210. The length of slit 220 correlates with, or controls, the stiffness of ramp 230. If slit 220 is short relative to the length of ramp 230, ramp 230 will be stiffer than if slit 220 is longer. In other words, as the contact area between the ramp 230 and the flange 210 decreases (e.g., as the length of slit 220 increases), the flexibility of ramp 230 increases. Conversely, as the contact area between the ramp 230 and the flange 210 increases (e.g., as the length of slit 220 decreases), the flexibility of ramp 230 decreases. As discussed herein, a ramp assembly 180 without a slit 220 between flange 210 and ramp 180 does not provide the ramp 230 with the flexibility as described in the instant disclosure.

Figure 3:
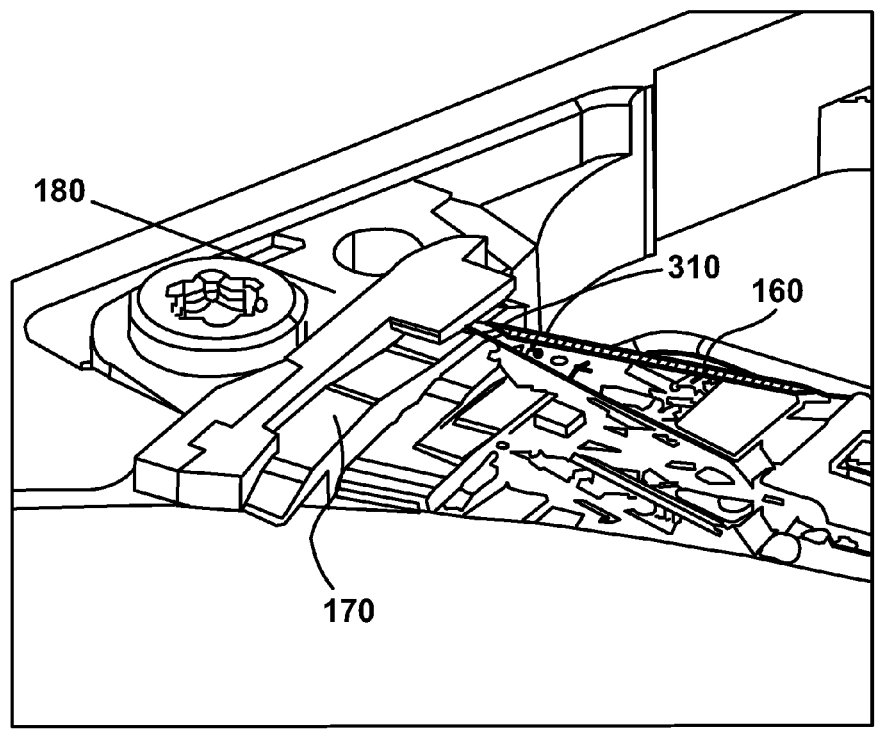
FIG. 3 is an example diagram of a portion of a hard disk drive, in accordance with one embodiment

A flexible ramp 230 is desired to prevent abrasion debris due to contact with magnetic disk 138. In an embodiment, abrasion debris is reduced by reducing the force with which disk 138 contacts ramp 230. However, there are cases where the magnetic head 310 (as shown in FIG. 3) on the ILS 160 breaks the magnetic disk 138. For instance, as the stiffness of ramp body 230 is reduced, the ability to control deformation of magnetic disk 138 is decreased. The risk of the magnetic head 310, ILS 160, or actuator arm 145 contacting and damaging magnetic disk 138 is increased when magnetic disk 138 is deformed. Stiffer ramps 230 are an effective way to prevent this risk because stiffer ramps 230 decrease disk 138 deformation and prevent contact between the magnetic disk 138 and the ILS 160, head 310, and/or actuator arm 145.

In one embodiment, in order to allow ramp assembly 180 to be flexible without allowing disk 138 to contact the ILS 160, head 310, and/or actuator arm 145: (1) the stiffness of the ramp 230 is lowered by disposing a slit 220 between flange 210 and ramp 230; and (2) disposing at least one stopper 250 above, below, or above and below the slit 220 such that when the flexible ramp 230 is pushed the flange 210 and stopper 250 come into contact creating a stiffer ramp 230.

Figure 4:
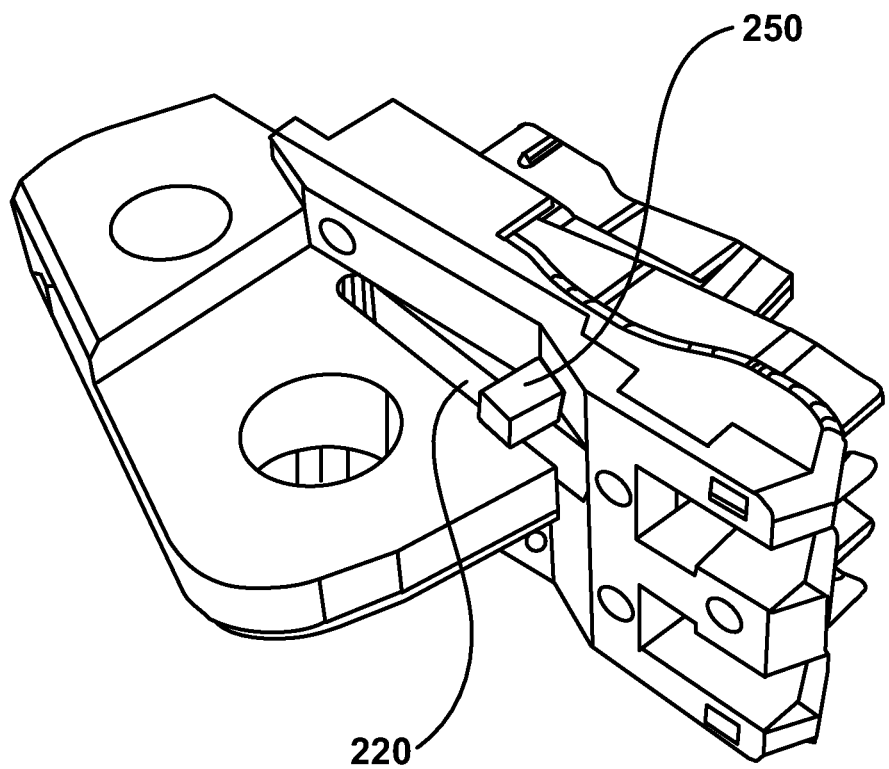
FIG. 4 is an example diagram of a ramp assembly, in accordance with one embodiment.

FIG. 4 shows an example of a stopper 250 protruding from ramp body 230 above the slit 220. With stoppers 250 above and below flange 210, the ramp 230 can move up or down in a vertical plane (in comparison to the horizontal plane that the base of the HDD housing 113 lies upon) with a particular flexibility before ramp 230 hits a stopper 250. After hitting a stopper 250, ramp 230 stiffness increases accordingly and deformation of magnetic disk 138 can be controlled.

For the purposes of this discussion, the front end of the flange 260 is the end of flange 210 that is perpendicular to the base of housing 113, that when installed in HDD 110 faces the magnetic disk 138 (as shown in FIGS. 2A and 2B). Correspondingly, a back end of the flange 280 is located on an opposite side of the flange 210 from the front end of the flange 260.

In some embodiments, ramp 230 stiffness may be controlled by the position of stoppers 250. For example, if stopper 250 is 1 millimeter from the front end of the flange 260, there will be less stiffness than if stopper 250 is 3 millimeters from the front end of the flange 260. This is because a stopper 250 that is 3 millimeters from the front end of the flange 260 requires less movement by ramp 230 to contact flange 210 than if the stopper 250 was located 1 millimeter from the front end of the flange 260.

In one embodiment, stoppers 250 are disposed above and below slit 220 at different distances from the front end of the flange 260. In one embodiment, stoppers 250 are the same distance from the front end of the flange 260. In one embodiment, the distance between slit 220 and a stopper 250 above slit 220 is different than the distance between slit 220 and a stopper below slit 220. In one embodiment the distance between the slit 220 and the stopper 250 or stoppers 250 is narrower than the gap between a magnetic disk 138 and a head 310, ILS 160, or actuator arm 145.

In some embodiments only one stopper 250 is used. In an embodiment where there is only one stopper 250 below the flange 210, slider 170 controls deformation of the magnetic disk 138 if the ramp 230 were to move down in relation to the flange 210. In an embodiment where there is only one stopper 250 above the flange 210, slider 170 controls deformation of the magnetic disk 138 if the ramp 230 were to move up in relation to the flange 210.

Figure 5:
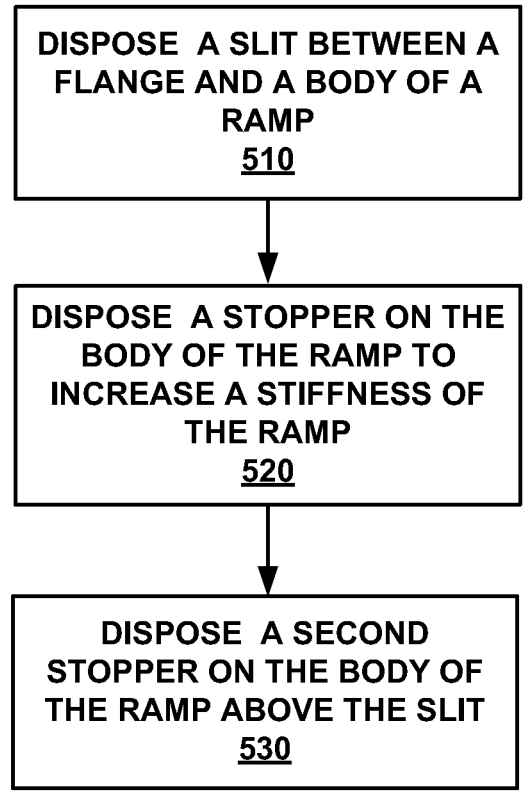
FIG. 5 is example flowchart for reducing abrasion debris generated by a magnetic disk contacting a ramp in a hard disk drive, in accordance with embodiments.

The following discussion sets forth in detail an example method of manufacturing a hard disk drive with a flexible ramp assembly 180. FIG. 5 illustrates example procedures used by various embodiments. Although specific procedures are disclosed in flow diagram 500, such procedures are examples. That is, embodiments are well suited to performing various other procedures or variations of the procedures recited in flow diagram 500. Likewise, in some embodiments, the procedures in flow diagram 500 may be performed in an order different than presented and/or not all of the procedures described may be performed, and/or one or more additional operations may be added.

FIG. 5 is a flow diagram 500 of an example method of manufacturing a hard disk drive, in accordance with one embodiment.

In operation 510, in one embodiment, a slit 220 is disposed between a flange 210 and a ramp body 230. Slit 220 allows the ramp 230 to be flexible. The longer the slit 220 is, the more flexible the ramp 230 is.

In operation 520, in one embodiment, a stopper 250 is disposed on the ramp body 230. The stopper 250 prevents the ramp 230 from being too flexible by coming into contact with the flange 210.

In operation 530, a second stopper 250 is disposed above the ramp body 230 above the slit 220. When stoppers 250 are disposed on both sides of the slit 220, an HDD 1110 may be dropped on its cover or on its base and a stopper 250 will assist with preventing the ramp 230 from not being stiff enough.

Embodiments of the present technology are thus described. While the present technology has been described in particular embodiments, it should be appreciated that the present technology should not be construed as limited by such embodiments, but rather construed according to the following claims.

What is claimed is:

1. A ramp for a hard disk drive (HDD) comprising:
a slider disposed on a ramp body;

a flange disposed adjacently to said ramp body, wherein said flange is disposed on an opposite side of said ramp body from said slider;
a slit located between a ramp body and said flange; and
a stopper disposed on a ramp body adjacent to said slit to increase a stiffness of said ramp, wherein said stopper protrudes from a surface of said ramp body facing said flange wherein a space exists between said stopper and said flange.

2. The ramp of claim 1, wherein said stopper is disposed on said ramp body above said slit.

3. The ramp of claim 1, wherein said stopper is disposed on said ramp body below said slit.

4. The ramp of claim 1, wherein said stopper is disposed on said ramp body below said slit, further comprising:
a second stopper located above said slit to increase a stiffness of said ramp, wherein said second stopper protrudes from a surface of said ramp body facing said flange, and wherein a second space exists between said second stopper and said slit.

5. The ramp of claim 4, wherein said stopper is disposed on said ramp body closer to a front end of said flange than said second stopper, wherein said front end of said flange is an end of said flange that when implemented in said HDD is an end of said flange closest to a central drive hub comprised within said HDD.

6. The ramp of claim 4, wherein said second stopper is disposed on said ramp body closer to a front end of said flange than said stopper, wherein said front end of said flange is an end of said flange that implemented in said HDD is an end of said flange closest to a central drive hub comprised within said HDD.

7. The ramp of claim 1, wherein said stiffness of said ramp corresponds to a length of said slit.

8. The ramp of claim 1, wherein a first gap between said slit and said stopper is narrower than a second gap between a magnetic disk and an actuator.

9. The flange of claim 1, wherein said slit separates said flange and said ramp body, wherein said slit begins at a front end of said flange and ends before a back end of said flange, and wherein a stiffness of said ramp corresponds to a length of said slit.

10. A hard disk drive (HDD) comprising:
a magnetic disk;
an actuator to move a head over said magnetic disk; and
a ramp to support said head comprising:
a slider disposed on a ramp body;
a flange disposed adjacently to said ramp body, wherein said flange is disposed on an opposite side of said ramp body from said slider;
a slit located between said ramp body and said flange, wherein said slit separates a portion of said flange and said ramp body, and wherein said slit begins at a front end of said flange and ends before an opposite side of said flange and said ramp body, wherein said front end of said flange is an end of said flange that when implemented in said HDD is closer to said magnetic disk; and
a stopper to increase a stiffness of said ramp, wherein said stopper protrudes from a surface of said ramp body facing said flange.

11. The HDD of claim 10, wherein said stopper is disposed on said ramp body below said slit, and wherein a first space exists between said stopper and said slit, further comprising:
a second stopper located above said slit to increase a stiffness of said ramp, wherein said second stopper protrudes from a surface of said ramp body facing said flange, and wherein a second space exists between said second stopper and said slit.

12. The HDD of claim 10, wherein said stopper is disposed on said ramp body above said slit, and wherein a space exists between said stopper and said slit.

13. The HDD of claim 10, wherein said stopper is disposed on said ramp body below said slit, and wherein a space exists between said stopper and said slit.

14. The ramp of claim 10, wherein said stiffness of said ramp corresponds to a length of said slit.

15. The ramp of claim 10, wherein a first gap between said slit and said stopper is narrower than a second gap between said magnetic disk and said actuator.

16. The magnetic disk of claim 10, wherein said magnetic disk is glass.

17. The magnetic disk of claim 10, wherein said magnetic disk is aluminum.

18. The ramp of claim 10, wherein said ramp is resin.

19. A method for reducing abrasion debris generated by a magnetic disk contacting a ramp in a hard disk drive (HDD), said method comprising:
disposing a slit between a flange and a ramp body, wherein said flange and said ramp body are attached, and wherein said slit separates a portion of said flange and said ramp body, and wherein said slit begins at a front end of said flange and ends before a back end of said flange, wherein said front end of said flange is an end of said flange that when implemented in said HDD is an end of said flange closest to said magnetic disk and said back end of said flange is an end of said flange that when implemented in said HDD is located on an opposite side of said flange from said front end; and
disposing a stopper on said ramp body to increase a stiffness of said ramp, wherein said stopper protrudes from a surface of said ramp body facing said flange.

20. The method of claim 19, further comprising:
disposing a second stopper on said ramp body above said slit, wherein said second stopper protrudes from said surface of said ramp body facing said flange, wherein a space exists between said second stopper and said slit, and wherein said stopper is disposed below said slit.

* * * * *